United States Patent
Utz

(10) Patent No.: US 6,316,947 B1
(45) Date of Patent: Nov. 13, 2001

(54) DISPLACEMENT/ANGULAR POSITION SENSOR

(75) Inventor: Rainer Utz, Ostfildern (DE)

(73) Assignee: Horst Siedle GmbH & Co., KG, Furtwangen (DE)

( * ) Notice: Subject to any disclaimer, the term of this patent is extended or adjusted under 35 U.S.C. 154(b) by 0 days.

(21) Appl. No.: 09/433,035

(22) Filed: Oct. 29, 1999

Related U.S. Application Data

(63) Continuation of application No. PCT/DE98/01069, filed on Apr. 15, 1998.

(30) Foreign Application Priority Data

Apr. 29, 1997 (DE) .............................................. 197 18 024

(51) Int. Cl.⁷ .............................. G01R 27/26; G01R 27/08
(52) U.S. Cl. ........................... 324/658; 324/723; 324/688
(58) Field of Search ................................... 324/658, 723, 324/627, 724, 688; 338/64, 65

(56) References Cited

U.S. PATENT DOCUMENTS

| | | | |
|---|---|---|---|
| 5,049,827 | * 9/1991 | Tasma | 324/723 |
| 5,479,057 | 12/1995 | Rossi et al. | |
| 5,525,955 | 6/1996 | Tonogai et al. | |

FOREIGN PATENT DOCUMENTS

| | | |
|---|---|---|
| 35 11 190 A | 10/1985 | (DE) . |
| 38 22 314 A | 1/1989 | (DE) . |

OTHER PUBLICATIONS

Patent Abstracts of Japan, vol. 096, No. 009, Sep. 30, 1996 & JP 08 114410 A (Fuji Photo Optical Co. Ltd.), May 7, 1996.

Patent Abstracts of Japan, vol. 096, No. 009, Sep. 30, 1996 & JP 08 114409 A (Fuji Photo Optical Co. Ltd.), May 7, 1996.

* cited by examiner

*Primary Examiner*—Safet Metjahic
*Assistant Examiner*—Anjan K Deb
(74) *Attorney, Agent, or Firm*—Darby & Darby

(57) ABSTRACT

A displacement/angular position sensor including a potentiometer path (20), which is arranged on a carrier (10) and to which an alternating voltage can be applied, a collector path (30) arranged on the carrier (10), a first probe (70) guided for displacement above the potentiometer path (20), and a second probe (80) electrically coupled with the latter and guided for displacement above the collector path. Screening surfaces (11, 12, 13, 14), connected to frame potential, are provided that surround the potentiometer path (20) and the collector path (30) and the probes guided above them so that both the potentiometer path (20) with the first probe (70) associated to it and the collector path (30) with the second probe (80) associated to it are each arranged in a spatially separate, screened space (22,32).

7 Claims, 4 Drawing Sheets

DISPLACEMENT/ANGULAR POSITION SENSOR

This is a continuation of International Application No., filed PCT/DE98/01069 filed Apr. 15, 1998.

FIELD OF THE INVENTION

The present invention relates to a capacitance-coupled contactless displacement/angular position sensor comprising a potentiometer path, which is arranged on a carrier and to which an alternating voltage can be applied, a collector path arranged on the carrier, a first probe guided for displacement above the potentiometer path, and a second probe electrically coupled with the latter and guided for displacement above the collector path.

DESCRIPTION OF RELATED ART

A capacitance-coupled contactless displacement/angular position sensor of that kind has been disclosed, for example, by U.S. Pat. No. 5,525,955.

Displacement/angular position sensors of that kind are used, for example, in hydraulic cylinders for detecting the cylinder position.

In the case of a known displacement sensor, illustrated in FIG. 3, both the potentiometer path 82 and the collector path 84 are arranged on both sides of a carrier 80 of substantially I-shaped configuration.

In most of the cases the carrier 80 is surrounded by a metallic tube that screens off any electromagnetic inferences from the outside. However, such screening is not capable of avoiding overcoupling effects between the potentiometer path 82 and the collector path 84 that are produced by a substantially dipolar electric field E forming around the potentiometer path 82 and the collector path 84 (compare FIG. 3).

But even with the potentiometer path 82 and the collector path 84 provided in any other arrangement, for example in the parallel arrangement of the potentiometer path and the collector path described in U.S. Pat. No. 5,525,955, electric interference fields E may occur that have a negative influence on the operation of the displacement/angular position sensor.

In addition, numerous parasitic capacitances and loss resistances are encountered with such displacement/angular position sensors. A diagrammatic representation of such parasitic impedances is provided in FIG. 4.

As can be seen in FIG. 4, parasitic capacitances Cpm' and loss resistances Rpm' are encountered between the potentiometer path and frame, for example a housing.

Parasitic capacitances Ckm' and loss resistances Rkm' are also encountered between the collector path and frame.

In addition, parasitic capacitances Csm and loss resistances Rsm occur between the electric coupling line of the two measuring probes and frame.

Finally, other parasitic capacitances and loss resistances result from the connection lines and the evaluation electronics.

SUMMARY OF THE INVENTION

Now, it is the object of the present invention to improve a displacement/angular position sensor of the generic kind in such a way that interference influences provoked by both electromagnetic fields and parasitic capacitances and loss resistances are minimized, whereby the measuring precision of the displacement/angular position sensor is improved.

The invention achieves this object with a displacement/angular position sensor of the before-mentioned kind by the fact that screening surfaces, connected to frame potential, are provided that surround the potentiometer path and the collector path and the probes guided above them so that both the potentiometer path with the first probe associated to it and the collector path with the second probe associated to it are each arranged in a spatially separate, screened space.

Arranging the potentiometer path with the first probe associated to it, and the collector path with the second probe associated to it in spatially separate, screened spaces provides the substantial advantage that any generation of electromagnetic fields between the potentiometer path and the collector path, and interfering influences resulting therefrom, can be largely avoided. Electromagnetic fields will only arise inside the two spatially separate, screened spaces and any field lines will be sort of "drawn off" in an especially favorable way by the screening surfaces connected to frame potential.

In principle, the screening surfaces may be configured and arranged in the most different kinds and ways. For example, they may be fixed to the carrier.

A particularly favorable embodiment, that has proved to be very favorable especially with respect to the production of the carrier and of the screening surfaces, provides that the screening surfaces are integrally formed with the carrier. In this way, both the carrier and the screening surfaces can be manufactured by a simple processing operation, for example by extrusion molding. In addition, it is further ensured in this way that the carrier and the screening surfaces are connected to the same potential, i.e. to frame potential.

With a view to minimizing any parasitic capacitances and loss resistances forming between the potentiometer path and the collector path and the carrier connected to frame potential, but also in order to simplify the assembly operations, an advantageous embodiment of the invention provides that projections for fixing both the potentiometer path and the collector path in their respective positions are provided on the carrier in each of the screened spaces, adjacent to the screening surfaces.

These projections permit on the one hand easy assembly of the potentiometer path and the collector path, and ensure on the other hand a very precise fixed position of the potentiometer path and the collector path so that a precise distance is obtained between the probes guided above the potentiometer path/collector path on the one hand, and the potentiometer path/connector path on the other hand.

In principle, the potentiometer path and the collector path may be fastened on the projections in the most different ways. For example, bonding them to the projections would be imaginable.

A very advantageous embodiment of the invention, which permits not only the assembly to be effected in a simple way, but also any irregularities of the projections or of the potentiometer path or collector path to be compensated for, provides that the potentiometer path and the collector path are urged against the projections by some elastic pull-back means, preferably a rubber cord.

In order to exclude any parasitic capacitances between the two separate areas of a potentiometer path, that has been linearized in the known way by milling off part of the resistance path in a controlled way, it is preferably provided that the projection arranged above the linearization area of the potentiometer path covers the linearization area of the potentiometer path. In this case, the carrier is of course connected to a defined voltage potential.

With respect to the configuration of the screening surfaces, no exact details have been provided so far. In principle, the screening surfaces may exhibit any shape, for example a plane, bent-off or any curved shape.

An especially advantageous embodiment of the invention, also with respect to the stability of the displacement/angular position sensor, provides that the screening surfaces are circularly bent toward the potentiometer path and the collector path, respectively, and that at least one opening, through which the probes can be introduced and establish electric contact, is provided between any two immediately opposite screening surfaces.

Further features and advantages of the invention will become apparent from the following description and from the illustrations of certain embodiments.

Figure 1:
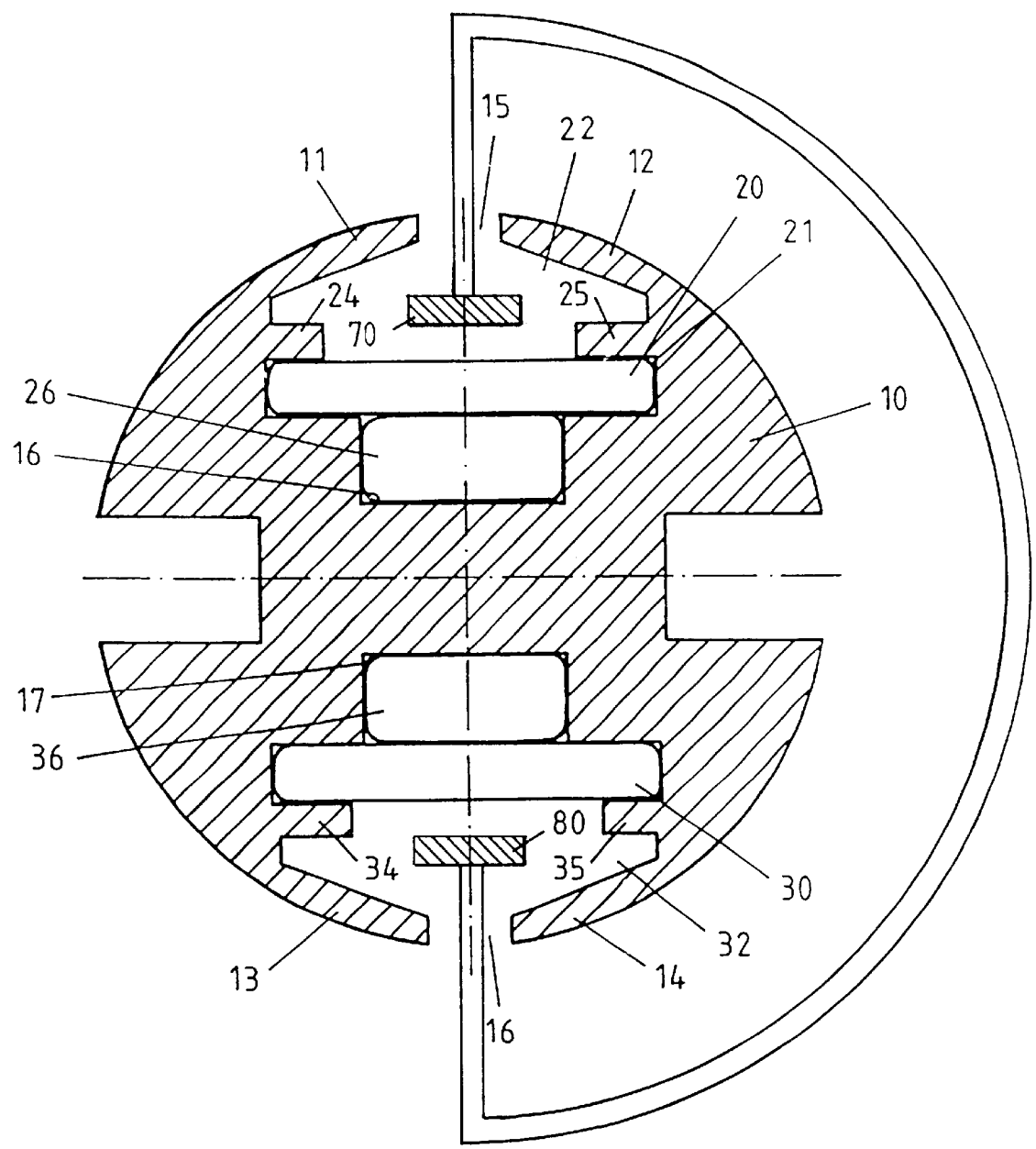
FIG. 1 shows a sectional representation of a first embodiment of a displacement/angular position sensor according to the invention.

One embodiment of a displacement/angular position sensor, illustrated in FIG. 1, comprises a carrier indicated in its entirety by 10, on which a potentiometer path 20 and a collector path 30 are arranged.

DETAILED DESCRIPTION OF THE PREFERRED EMBODIMENTS OF THE INVENTION

Formed integrally with the carrier 10 are screening surfaces 11, 12 that overlap the potentiometer path 20, and screening surfaces 13, 14 that overlap the collector path 30. The screening surfaces 11, 12, 13, 14 are circularly curved toward the potentiometer path 20 and the collector path 30, respectively, with one opening 15, 16 being respectively arranged between the screening surfaces 11, 12 facing the potentiometer path 20, and between the screening surfaces 13, 14 facing the collector path 30, for guiding and establishing electric contact with the first probe 70 associated with the potentiometer path, and with the second probe 80 associated with the collector path 30, respectively. In the present case, the probes 70, 80 are guided above the potentiometer/collector path (20, 30) in a direction vertical to the plane of the drawing.

As a result of the particular configuration of the screening surfaces 11, 12 and 13, 14, respectively, both the potentiometer path 20 and its associated first probe, and the collector path 30 and its associated second probe are arranged in spatially separate, screened spaces 22 and 32, respectively.

Given the fact that the screening surfaces 11, 12, 13, 14 and the carrier 10 are all connected to frame potential, any electric field lines emanating from the potentiometer path 20 or the collector path 30 are sort of "drawn off" by their adjacent screening surfaces 11, 12 and 13, 14, respectively, which are connected to frame; the arrangement makes use of the natural-law principle that field lines end vertically on conductive surfaces (in the present case the screening surfaces 11, 12, 13, 14).

By providing the two spatially separate, screened spaces 22, 32, with the potentiometer path 20 with its associated probe and the collector path 30 with its associated probe arranged therein, respectively, any interference provoked by an electric field of the kind encountered with the displacement/angular position sensors known from the prior art and described above in connection with FIG. 3 is largely prevented. Due to the particular configuration of the screening surfaces 11, 12, 13, 14 electric fields may occur only in the two spatially separate, screened spaces 22, 32, while the fields occurring in these two spaces cannot interact one with the other.

Figure 4:
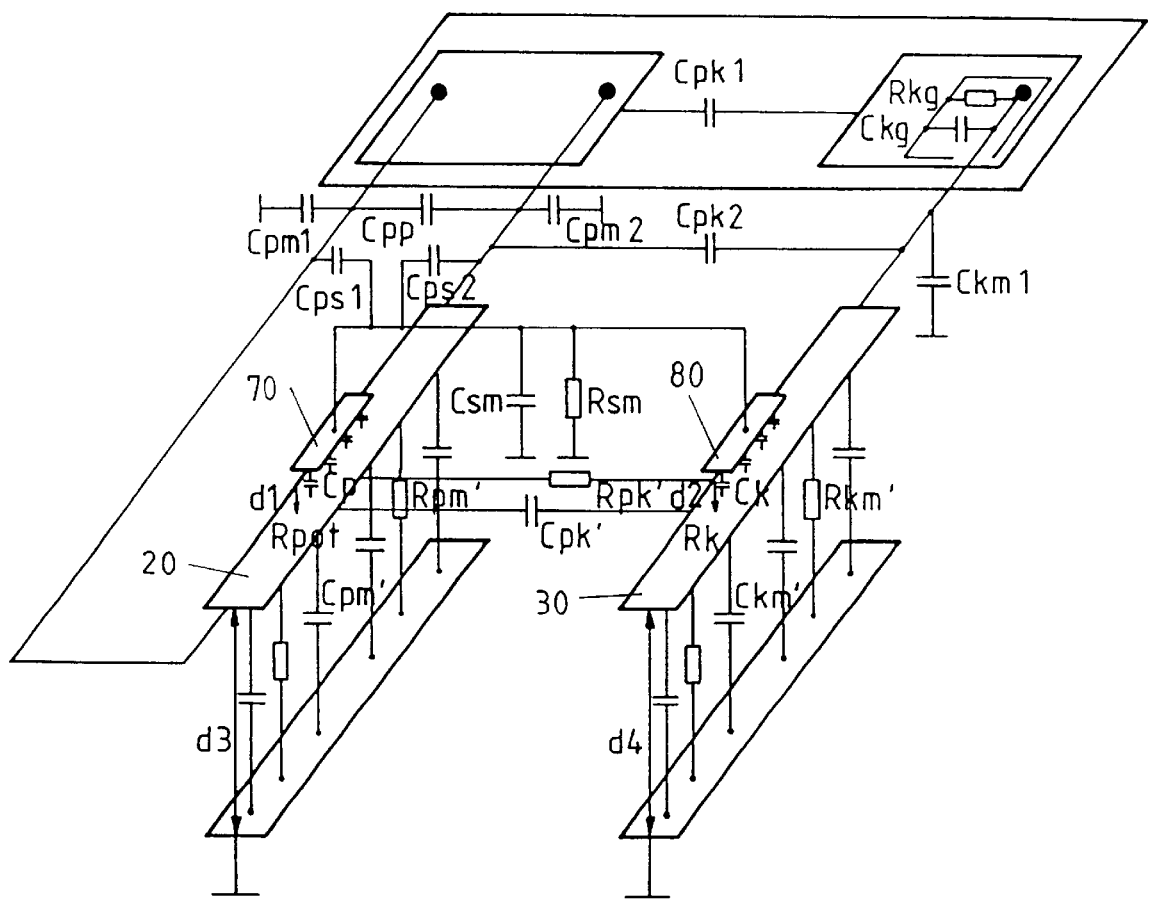
FIG. 4 is a diagrammatic representation of the parasitic capacitances and loss resistances that may in principle arise with displacement/angular position sensors.

Consequently, the described arrangement of the screening surfaces 11, 12, 13, 14 has the effect that any electric fields provoked by parasitic capacitances Cpk' and loss resistances Rpk' (compare FIG. 4) between the potentiometer path and the collector path are avoided because such electric fields cannot even arise.

Adjacent to the screening surfaces 11, 12 and 13, 14, respectively, there are provided carrier projections 24, 25 and 34, 35, respectively, that are contacted bey the potentiometer path 20 and the collector path 30, respectively.

Both the potentiometer path 20 and the collector path 30 are retained against their respective associated projections 24, 25 and 34, 35 for example by a rubber cord 26, 36 accommodated in a recess 16, 17 provided for them in the carrier 10 between the potentiometer path 20 and the surface of the carrier 10 that delimits the recess 16, and between the collector path 30 and the surface that delimits the recess 17, respectively. This elastic arrangement ensures that any irregularities of the projections 24, 25, 34, 35 and/or of the potentiometer path 20 or the collector path 30 can be compensated for. It should be noted in this connection that a carrier of the kind illustrated in FIG. 1 may very well have a length of 1000 mm or more so that any irregularities may have considerable effects.

The projections 24, 25, against which the potentiometer path 20 comes to rest, and the projections 34, 35, against which the collector path 30 comes to rest, allow precise positioning of the potentiometer path 20 and the collector path 30, respectively. Especially, these projections ensure that a constant spacing is maintained between the probes guided above the potentiometer path 20 and the collector path 30, on the one hand, and the potentiometer path 20 and the collector path 30 on the other hand. The length of one of the projections that overlap the potentiometer path 20 is selected to ensure that the linearization area 21 of the potentiometer path 20 is covered by the projection 25. The projection 25 and the carrier 10 are connected to the same defined voltage potential, for example to frame potential. This avoids any parasitic capacitances between the two separate areas of the potentiometer path, which has been linearized in the known way by milling off part of the resistance path.

Due to this configuration of the displacement/angular position sensor any parasitic capacitances Cpm' and loss resistances Rpm' between the potentiometer path 20 and frame potential, and any parasitic capacitances Ckm' and loss resistances Rkm' between the collector path 30 and frame potential are likewise minimized.

Figure 2A:
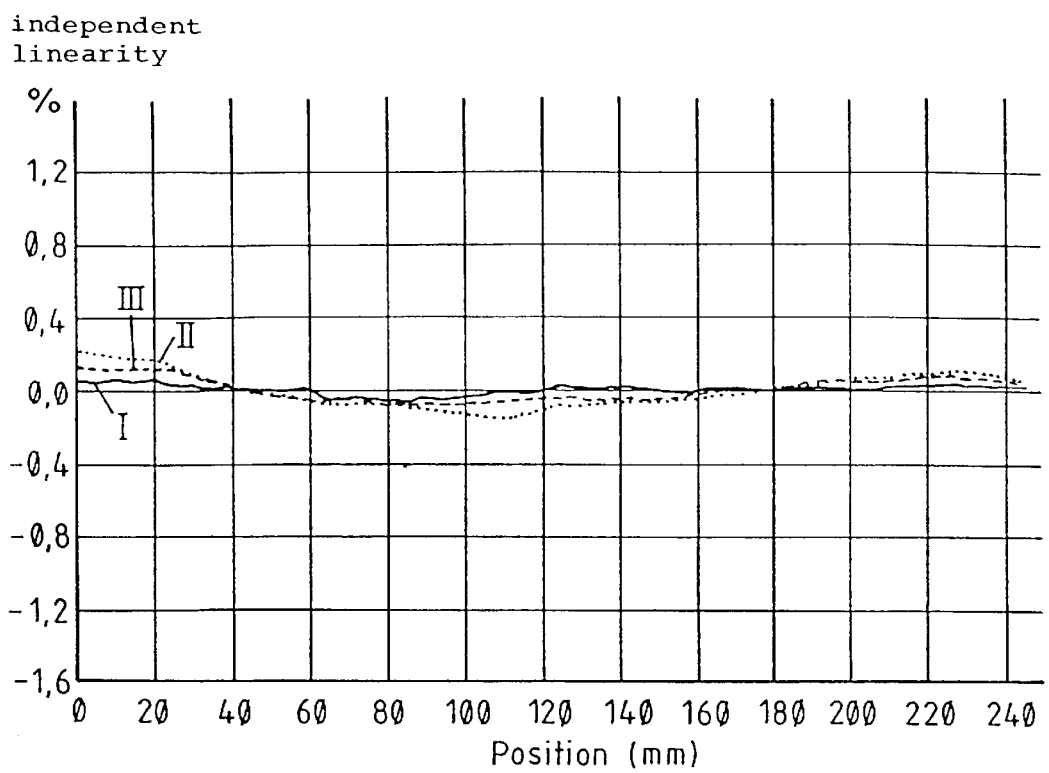
FIGS. 2a, 2b show diagrams of the independent linearity as a function of the position, for the displacement/angular position sensor illustrated in FIG. 1(a) and for the displacement/angular position sensor known from the prior art and illustrated in FIG. 3(b)

FIG. 2a shows a diagram of the independent linearity as a function of the position of a displacement sensor of the kind illustrated in FIG. 1.

The curve indicated by I represents the development of the linearity in response to the position of the probes of the displacement sensor, without a metallic tube surrounding it. The curve indicated by II represents linearity measurements as a function of the position of the probes of the displacement sensor, with the latter arranged in a potential-free tube. The linearity curve as a function of the probe position indicated by III corresponds to the same curve for the displacement sensor arranged in a tube that is connected to frame potential.

Figure 2B:
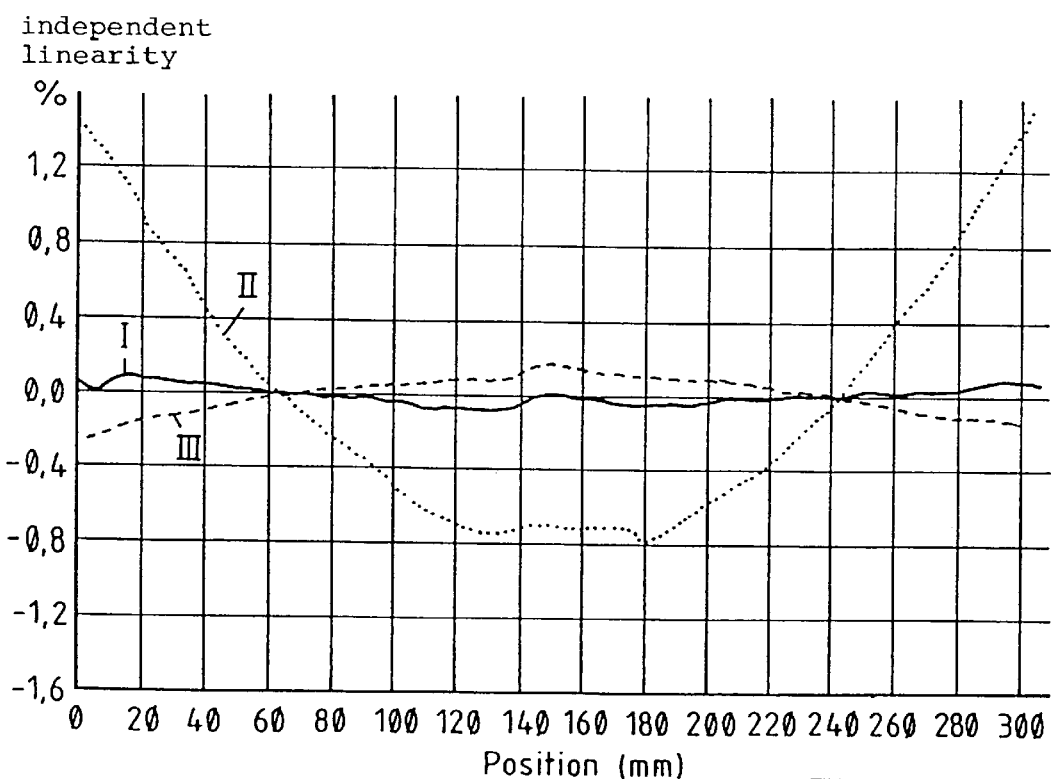
Figure 3:
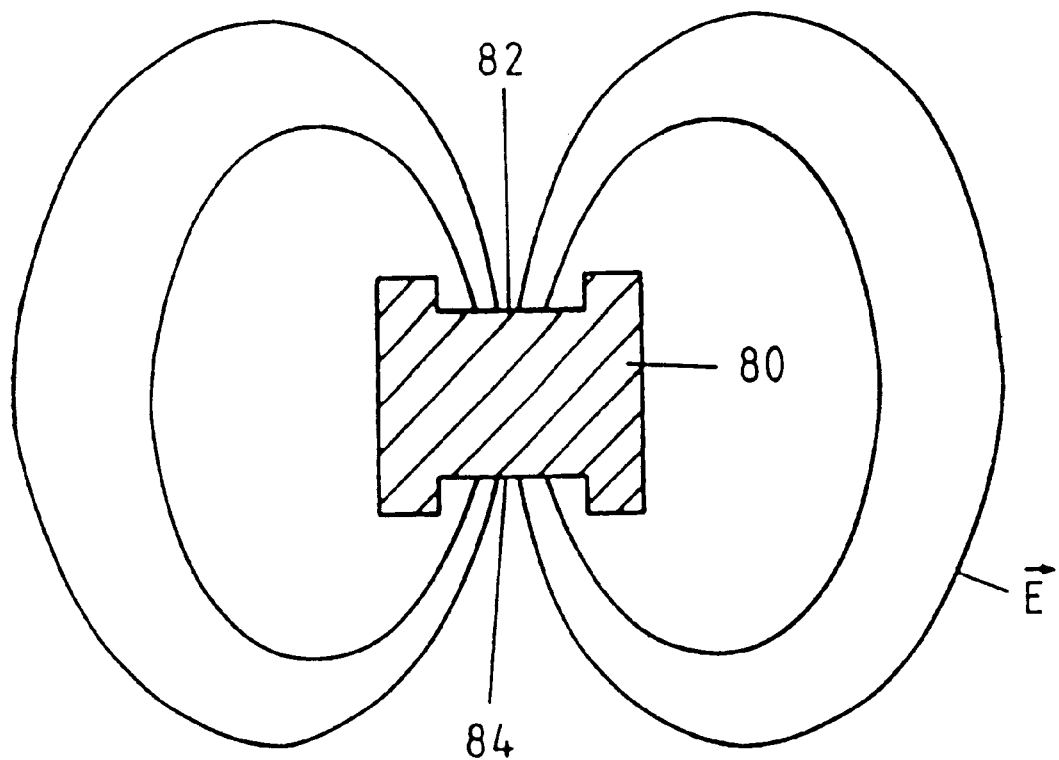
FIG. 3 shows a sectional representation of the displacement/angular position sensor known from the prior art, with the probes omitted.

FIG. 2b shows correspondingly the linearity curve as a function of position for a displacement sensor of the kind illustrated diagrammatically in FIG. 3. The measurements illustrated in FIG. 2b were taken under the same measuring conditions as the measurements shown in FIG. 2a. The designations of the different measuring curves are the same as in FIG. 2a.

A comparison between FIG. 2a and FIG. 2b shows that very good linearity is obtained with the displacement sensor illustrated in FIG. 1, irrespective of its arrangement and the surrounding conditions, whereas the displacement sensor, whose linearity curve is illustrated in FIG. 2b, shows a considerably less favorable development of the linearity as a function of position, which is in addition dependent on the arrangement of the displacement sensor and the surrounding conditions.

For example, in the case illustrated in FIG. 2b, an especially non-linear curve is obtained when the displacement sensor is arranged in a potential-free tube. Such influences have no effect whatsoever in the case of the displacement sensor illustrated in FIG. 1, whose linearity curve is illustrated in FIG. 2a.

In summary, it can be noted that an improvement in linearity is achieved with the displacement sensor illustrated in FIG. 1, which is independent of the measuring conditions, the arrangement of the displacement sensor and the surrounding conditions.

What is claimed is:

1. A capacitance-coupled contactless displacement/angular position sensor comprising:

a carrier (10);

a potentiometer path (20), arranged on the carrier (10), an alternating voltage is appliable to the potentiometer path;

a collector path (30) arranged on the carrier (10);

a first probe (70) guided for displacement above the potentiometer path (20);

a second probe (80) electrically coupled with the first probe and guided for displacement above the collector path; and screening surfaces (11, 12, 13, 14) connected to frame potential surround the potentiometer path (20) and the collector path (30) and the probes guided above them so that both the potentiometer path (20) with the first probe associated to it and the collector path (30) with the second probe associated to it are each arranged in a spatially separate screened space (22,32).

2. The displacement/angular position sensor according to claim 1, wherein the screening surfaces (11, 12, 13, 14) are integrally formed with the carrier (10).

3. The displacement/angular position sensor according to claim 1, wherein the carrier comprises projections (24, 25, 34, 35) projecting into each of the screened spaces (22, 32) adjacent to the screening surfaces (11, 12, 13, 14) for fixing both the potentiometer path (20) and the collector path (30) in their positions.

4. The displacement/angular position sensor according to claim 3, further comprising pull-back means for urging the potentiometer path (20) and the collector path (3) against the projections (24, 25, 34, 35).

5. The displacement/angular position sensor according to claim 3, wherein the projection (25) is arranged above and covers a linearization area (21) of the potentiometer path (20).

6. The displacement/angular position sensor according to claim 1, wherein the screening surfaces (11, 12, 13, 14) are circularly bent toward the potentiometer path (20) and the collector path (30), respectively, and at least one opening (15, 16) is defined between any two immediately opposite screening surfaces (11, 12, 13, 14) through which the probes are introduced to establish electric contact.

7. The displacement/angular position sensor according to claim 4, wherein the pull-back means is rubber cords (26, 36).

* * * * *